United States Patent Office 3,389,133
Patented June 18, 1968

3,389,133
PROCESS FOR ISOLATING AND PURIFYING SOLUBLE RIBONUCLEIC ACID
Sidney Gutcho, Bronx, N.Y., assignor to Schwarz BioResearch, Inc., Orangeburg, N.Y., a corporation of New York
No Drawing. Filed Aug. 10, 1966, Ser. No. 571,389
10 Claims. (Cl. 260—211.5)

ABSTRACT OF THE DISCLOSURE

A process for obtaining a purified soluble ribonucleic acid wherein an aqueous solution of crude soluble ribonucleic acid is contacted with a highly polar solvent, either dimethyl sulfoxide, dimethylformamide or dimethylacetamide, and a soluble chloride, such as sodium chloride, the polar solvent being present in an amount between about 33% and 45%, by volume, of the mixture. As a result of the contact, impurities are precipitated from the solution and the clear phase is then treated with an alcohol to precipitate the soluble ribonucleic acid therefrom. The crude soluble ribonucleic acid may be isolated from *E. coli* by disrupting the cells with a mixture of phenol and water, preferably at least 405 milliliters of phenol and at least 935 milliliters of water whereby two phases are separated without high speed centrifugation.

---

This invention is directed to a process for isolating a ribonucleic acid, and more particularly to a process for isolating and purifying a soluble ribonucleic acid (hereinafter sometimes referred to as "sRNA").

In recent years, investigation has increased into the function of sRNA in protein synthesis which has resulted in a greater demand for sRNA of high purity.

Soluble RNA has been isolated from microorganisms, particularly yeast cells and *Escherichia coli* (hereinafter sometimes referred to as "*E. coli*"), with significant quantities of sRNA being isolated from large quantities of yeast as described by Holly (Biochem. Biophys. Res. Comm., 10, 186 (1963)).

The recovery of sRNA from *E. coli*, however, presents diverse problems including:

(a) Recovery of the aqueous phase from the cellular solids and the phenol phase requires high speed centrifugation as compared to the recovery of sRNA from yeast cells wherein the aqueous phase may be siphoned off after permitting the initial mixture to stand for several days.

(b) Utilization of phenol to disrupt the cells of *E. coli* solubilizes into the aqueous phase high molecular weight RNA, deoxyribonucleic acid, and considerable amount of non-ultraviolet light absorbing materials, such as proteins and polysaccharides, in addition to the desired soluble nucleic acids. In contrast, the effect of phenol on yeast cells comprises a "sieving" effect of low molecular weight particles including sRNA and only a minor amount of high molecular weight nucleic acid.

(c) The isolation of sRNA of high purity from crude sRNA generally involves many steps in addition to the use of alcohol, including precipitation, fractionation of ribonucleic acids, dialysis and column chromatography.

Accordingly, an object of this invention is to provide a process for isolating sRNA from microorganisms.

Another object of this invention is to provide a process for producing sRNA of high purity.

A further object of this invention is to provide a process for isolating sRNA of high biological activity.

Still another object of this invention is to provide a process for isolating sRNA at higher yields.

Still another object of this invention is to provide a relatively simple process for purifying sRNA.

These and other objects will become more readily apparent from the following detailed description of the invention.

The objects of this invention are broadly accomplished by disrupting the cells of a microorganism containing sRNA to obtain crude sRNA, and purifying the crude sRNA with a soluble chloride and a highly polar solvent.

More particularly, phenol and water are added to a microorganism (containing sRNA) in an amount sufficient to effectively disrupt the cells of the microorganism and to effect separation of an organic phase and an aqueous phase containing crude sRNA. In treating *E. coli* with phenol and water, a clear aqueous phase containing crude sRNA may be obtained without high speed centrifuging if at least about 405 milliliters of phenol and at least about 935 milliliters of water are added per 100 grams of starting material. The phenol and water are generally used in the exact amounts recited above since larger volumes unnecessarily dilute the sRNA and require larger volumes of alcohol to precipitate crude sRNA in the subsequent recovery step, while lower volumes necessitate high speed centrifugation to separate the layers.

The crude sRNA is precipitated from the aqueous phase, for example, by the addition of an alcohol such as ethanol, and the recovered sRNA is subjected to a standard incubation procedure. The incubation "unloads" amino acids bound to the sRNA and is generally effected by subjecting a basic solution of sRNA to a temperature of about 37° C. for about one hour.

Any one of a wide variety of substances containing a sRNA fraction may be used in the process of the invention, and as representative examples, there may be mentioned: *Escherichia coli* (*E. coli*), such as strains B, W, K12, K12–W6; non-pathogenic bacteria, such as Lactobacilli, Bacilli, *Micrococcus lysodeikticus*; yeast; molds such as *Neurospora crassa*; seeds; germinating seeds; parts of germinating seeds, such as stems, leaves, rootlets; mammalian tissues, such as rat liver; and the like. The starting materials which give the best results are the various strains of *E. coli*, but it is to be understood that the invention is not limited to these materials.

Crude sRNA may be purified according to the process of the invention by adding a highly polar solvent and a water soluble chloride to an aqueous solution of sRNA to precipitate impurities. The precipitate is separated from the clear phase containing purified sRNA and the sRNA precipitated therefrom, e.g., by the addition of an alcohol, such as ethanol. The recovered sRNA may then be further purified by the above procedure to obtain higher purity and improved biological activity.

More particularly, the highly polar solvent is either dimethylformamide, dimethyl sulfoxide, or dimethylacetamide, with dimethyl sulfoxide being preferred, and the soluble chloride is either potassium, sodium, ammonium or magnesium chloride with sodium chloride being preferred. The addition is effected at a temperature between about 15° C. and 35° C. since lower temperatures precipitate and higher temperatures destroy sRNA. In order to obtain a clear solution of sRNA, the total mixture should contain between about 33% and about 45%, by volume, of the highly polar solvent. The chloride ion concentration is generally at least about 0.27 M and when sodium chloride is employed as the soluble chloride, the final mixture generally contains about 9%, by volume, of 3 M sodium chloride.

The following illustrates a preferred procedure for producing purified sRNA from *E. coli*, but it is to be understood that the scope of the invention is not to be limited thereby.

Procedure

The production of sRNA is followed by ultra-violet measurements of aqueous solutions at 260 mµ and measurements are given in optical density units, $A_{260}$(OD).

100 pounds of frozen *E. coli* are mixed with 86 liters of 88% phenol (U.S.P. or better grade) and the mixture stirred rapidly to form a uniform, well dispersed slurry (about 1.0–1.5 hours). 200 liters of de-ionized water are mixed into the slurry, the mixture stirred for about an hour and left standing overnight. On the following day, an additional 96 liters of phenol are added, the mixture stirred for 0.5 hour, an additional 220 liters of de-ionized water added, and mixing continued for about one hour. The mixture is again left standing overnight.

On the following day, the top aqueous layer (about 400 liters), containing sRNA, is siphoned from the mixture and buffered by the addition of 20% potassium acetate, pH 5.2, generally in an amount equal to about 1% of the aqueous volume. The sRNA is then precipitated by two volumes of absolute alcohol (3 A) and the precipitated solids allowed to settle out overnight.

On the next day, the clear alcoholic solution is siphoned from the alcoholic suspension and the crude sRNA recovered by filtration. The sRNA is then washed with both cold 75% ethanol and cold isopropanol, with the isopropanol washing preventing darkening of the product upon drying. The product is dried free of alcohol in vacuo at 25° to 30° C., with the yield being between about 500 to 800 grams per 100 lbs. of *E. coli*. The $A_{260}$ content should be in a range of $6-9 \times 10^6$.

The dried solids are placed in a 40 liter glass jar and a 0.05 N potassium acetate solution added thereto. The suspension is kept at about 15 to 20° C. and additional potassium acetate solution added until an ultra-violet reading of between 350 and $360 \times 10^3$ $A_{260}$/liter is obtained. The pH is then adjusted to 8.8–8.9 (pH meter reading) with 5 N ammonium hydroxide and, if necessary, acetic acid added immediately to neutralize excess ammonium hydroxide. The resulting solution is incubated with agitation for one hour at about 35–37° C., cooled to about 15–20° C., and glacial acetic acid added to adjust the pH to about 7.0–7.2. The neutralized solution is maintained at a temperature of about 10 to 15° C. and about 0.70 volume of dimethyl sulfoxide added with agitation. The temperature of the solution is regulated to between about 30 to 32° C. and 0.25 volume (based on the amount of aqueous sRNA solution) 3 M sodium chloride (175.5 grams sodium chloride, reagent grade/liter) added with agitation. The mixture is kept at about 30 to 32° C. for a half hour. The solution is then filtered on 950 paper, using a 22.5 inch diameter crock, and the precipitate washed with a cold mixture of water, dimethyl sulfoxide and 3 M sodium chloride (1:1:0.25). The sRNA in the filtrate and wash is precipitated by the addition of 0.5 volume of ethyl alcohol and the precipitate washed with cold 75% ethyl alcohol and isopropyl alcohol. The precipitate is dried in vacuo at 25 to 30° C. to remove all alcohol, and an $A_{260}$ measurement taken of the recovered solid. The $A_{260}$/mg. is in the range 16–18.

The sRNA recovered above is dissolved in water, $640 \times 10^3$ $A_{260}$/liter, an equal volume of dimethyl sulfoxide added with agitation, at 10 to 15° C., and the temperature maintained below 30 to 32° C. Then, 0.20 volume of 3 M sodium chloride solution is added, the mixture cooled to 20 to 23° C., filtered, and the solids washed with a cold mixture of water, dimethyl sulfoxide, and 3 M sodium chloride. The filtrate and wash containing sRNA is contacted with 0.33 volume of ethyl alcohol to precipitate sRNA which is filtered and washed with cold 75% ethyl alcohol, and isopropanol. The sRNA is dried in vacuo at 25 to 30° C. with a yield in excess of 100 grams. The $A_{260}$/mg. should be in excess of 21 following additional drying in vacuo over $P_2O_5$.

It is to be understood that in utilizing the procedure of this invention for producing sRNA, all precautions known in the art for preventing contamination of the final product should be taken. Thus, for example, none of the preparations should be touched and only acid washed glassware should be utilized.

Although the purification of crude sRNA has been particularly described with reference to purifying crude sRNA obtained by disrupting a microorganism containing an sRNA fraction with phenol and water, it is to be understood that the purification procedure of the invention is equally applicable to purifying crude sRNA obtained by other procedures.

The following examples illustrate specific embodiments of the invention but the scope of the invention is not to be limited thereby.

EXAMPLE 1

297 grams of frozen *E. coli B* (22.6% dry solids) were thawed out by mixing with 282 milliliters 88% phenol. Then 660 milliliters of water were added, and additional phenol and water were added to bring the phenol content to 1200 milliliters and the water content to 2800 milliliters. Settling was apparent after a short time and after 24 hours, a 2450 milliliter aqueous layer could be siphoned off. The solution was extracted with 130 milliliters of 88% phenol and the recovered aqueous solution, 2340 milliliters, treated with 25 milliliters 20% potassium acetate, (pH 5.2), and 2 volumes of absolute alcohol. The recovered crude sRNA weighed 7.085 gms. and contained $68.1 \times 10^3$ $A_{260}$ units.

The crude sRNA was dissolved in 200 milliliters 0.05 M potassium acetate and the solution brought to a pH of 8.8 with 5 M ammonium hydroxide. The solution with the suspended solids was incubated at 37° C. for one hour and the suspension brought to a pH of 7.0 with acetic acid added at a temperature of 20° C. The crude sRNA ($70.5 \times 10^3$ $A_{260}$/270 milliliters) was precipitated with 2 volumes of absolute alcohol and recovered.

The dried crude, 6.3 grams, was dissolved in 100 milliliters of water and 100 milliliters of 3 M sodium chloride added. Addition of dimethyl sulfoxide was made until an aliquot could be centrifuged to give a clear supernatant liquor. This required the addition of 100 milliliters of dimethyl sulfoxide. After chilling, the precipitate was removed by centrifugation and washed with a mixture of water, 3 M sodium chloride and dimethyl sulfoxide (1:1:1). The clear solution contained $23.1 \times 10^3$ $A_{260}$ units. Addition of 2 volumes of alcohol precipitated the sRNA and the recovered solids were washed and dried. The dimethyl sulfoxide insoluble residue weighed 4.46 grams while the sRNA fraction weighed 1.373 grams.

Part of the sRNA fraction was dissolved in water (1.0 gram containing $16.3 \times 10^3$ $A_{260}$/25 milliliters water) and an equal volume of dimethyl sulfoxide and 0.20 volume of 3 M sodium chloride added. The precipitate was centrifuged off at 20° C. and washed with a cold mixture of water, dimethyl sulfoxide and 3 M sodium chloride (1:1:0.2). Upon adding 10 milliliters of absolute alcohol to the recovered solution ($16.3 \times 10^3$ $A_{260}$/69 milliliters), the sRNA precipitated. The sRNA was washed with both 75% ethyl alcohol and isopropanol and the dried product weighed 0.653 gram ($13.5 \times 10^3$ $A_{260}$). The yield, as calculated from 1.373 grams sRNA, is 0.900 gram.

The yield is equivalent to 3.02 grams sRNA per kilogram of *E. coli*, 22.6% dry solids, or 4.00 grams sRNA per kilo *E. coli*, 30% dry solids.

EXAMPLE 2

450 grams *E. coli B* (30% dry solids) were mixed with 1800 milliliters 88% phenol, 4200 milliliters water, and the mixture stirred for one hour at room temperature. 4 liters of aqueous phase were siphoned off on the next day and 40 milliliters 20% potassium acetate (pH 5.2) and 8 liters of ethyl alcohol were added.

The dried crude (4.91 g.; $72.5 \times 10^3$ $A_{260}$) was dissolved in 200 milliliters 0.05 M potassium acetate and the suspension was brought to a pH of 8.8 with 5 M ammonium hydroxide. After one hour at 37° C., the pH was brought to 7.2 with acetic acid.

To 190 milliliters of the above sRNA solution, 133 ml. dimethyl sulfoxide (0.70 volume) and 47.5 ml. 3 M sodium chloride (0.25 volume) were added with chilling. After 30 minutes, the insoluble matter was centrifuged off and washed with a cold mixture of water, dimethyl sulfoxide and 3 M sodium chloride (1:1:0.25). The dried residue weighed 2.945 grams ($47.4 \times 10^3$ $A_{260}$). The recovered mother liquor plus two washes contained $27.4 \times 10^3$ $A_{260}$/520 ml. Addition of 0.5 volume absolute alcohol (3 A) with chilling precipitated the sRNA. The solids were centrifuged off and washed with 75% ethyl alcohol and isopropanol. The recovered sRNA weighed 1.477 grams ($24.5 \times 10^3$ $A_{260}$).

1.3 grams of the sRNA were dissolved in 33 milliliters of water and 33 milliliters of dimethyl sulfoxide and 6.6 milliliters of 3 M sodium chloride added with chilling. The precipitate was centrifuged off and washed with a cold mixture of water, dimethyl sulfoxide and 3 M sodium chloride (1:1:0.2). The sRNA was precipitated from the solution by adding 24 milliliters of absolute alcohol. The recovered sRNA was washed with 75% ethyl alcohol, isopropanol, and dried in vacuo to give 0.966 gram sRNA ($19.7 \times 10^3$ $A_{260}$).

The yield is equivalent to 2.42 grams sRNA/kilogram of E. coli, 30% dry solids.

EXAMPLE 3

Utilizing the procedure of this invention, 3.46 grams of crude sRNA ($28.4 \times 10^3$ $A_{260}$) were obtained from 227 grams of E. coli W.

Following the incubation to "unload" bound amino acids, the solution of crude sRNA in 85 milliliters was mixed with 59.5 milliliters of dimethyl sulfoxide and 21.2 milliliters of 3 M sodium chloride while maintaining a temperature of about 32° C. The insoluble matter was centrifuged off and washed with a mixture of water, dimethyl sulfoxide and 3 M sodium chloride. The recovered mother liquor plus washes was treated with 0.5 volume absolute alcohol, with chilling, to precipitate the sRNA. The recovered sRNA weighed 0.966 gram ($15.7 \times 10^3$ $A_{260}$).

0.966 gram of the sRNA was dissolved in 24 milliliters of water and 24 milliliters of dimethyl sulfoxide and 4.8 milliliters of 3 M sodium chloride were added with chilling. The precipitate was centrifuged off at 23 to 25° C. and washed with a cold mixture of water, dimethyl sulfoxide and 3 M sodium chloride. The sRNA was precipitated from solution with 0.5 volume of absolute alcohol. The recovered sRNA was washed with 75% ethyl alcohol and isopropanol and dried in vacuo to give 0.672 gram of sRNA ($12.9 \times 10^3$ $A_{260}$). The yield is equivalent to 2.95 grams sRNA/kilo E. coli W, 30% solids.

EXAMPLE 4

11.5 grams of crude sRNA ($127 \times 10^3$ $A_{260}$) was obtained from 454 grams of E. coli K–12 by the procedure of this invention.

Following the incubation to "unload" bound amino acids, the solution of crude sRNA in 360 milliliters was mixed with 252 milliliters of dimethyl sulfoxide and 90 milliliters of 3 M sodium chloride at 29° to 31° C. After about a half hour, the insoluble matter was centrifuged off and washed with a cold mixture of water, dimethyl sulfoxide and 3 M sodium chloride (1:1:0.25). The recovered mother liquor plus washes were mixed with 0.5 volume absolute alcohol to precipitate sRNA. The solids were centrifuged off and washed with 75% ethyl alcohol and isopropanol, and the recovered sRNA weighed 3.214 grams ($57.3 \times 10^3$).

3.19 grams of the above sRNA were dissolved in 90 milliliters of water and 90 milliliters of dimethyl sulfoxide and 18 milliliters of 3 M sodium chloride were added with chilling. The precipitation was centrifuged off at 20° C. and washed with a cold mixture of water, dimethyl sulfoxide and 3 M sodium chloride (1:1:0.2). The sRNA was precipitated with 0.33 volume of absolute alcohol. The recovered sRNA was washed with 75% ethyl alcohol and isopropanol and dried in vacuo to give 1.94 grams of sRNA. The yield is equivalent to 4.26 grams sRNA per filiogram E. coli K–12, 30% solids. The $A_{260}$/mg. is 19.4.

EXAMPLE 5

5.42 grams of crude sRNA were obtained from 227 grams of E. coli B by the process of this invention.

Following the incubation to "unload" bound amino acids, the solution of 5.42 grams crude sRNA in 200 milliliters was treated with 200 milliliters of dimethylformamide and 200 milliliters of 3 M sodium chloride at 25° C. The insoluble matter was centrifuged off and washed with a mixture of water, dimethylformamide and 3 M sodium chloride. The recovered mother liquor plus washes was mixed with 0.5 volume of absolute alcohol to precipitate sRNA. The solids were centrifuged off and washed with ethyl alcohol and isopropanol. The recovered sRNA weighed 0.915 gram.

0.895 gram of the above sRNA was dissolved in 25 milliliters of water and 25 milliliters of dimethylformamide and 5 milliliters of 3 M sodium chloride were added at about 23° to 25° C. The precipitate was centrifuged off and washed with a cold mixture of water, dimethylformamide and 3 M sodium chloride. The sRNA was precipitated from solution by adding 0.33 volume of absolute alcohol. The recovered sRNA was washed with ethyl alcohol, isopropanol and dried in vacuo to give 0.698 gram of sRNA. The yield is equivalent to 3.14 grams sRNA/kilo of E. coli B, 30% dry solids. The $A_{260}$/mg. was 21.2.

The above procedure may also be performed using dimethylacetamide in place of dimethylformamide.

EXAMPLE 6

5 grams of crude sRNA were isolated from bakers' yeast by the Holly procedure [Biochem. Biophys. Res. Comm. 10, 186 (1963)].

The 5 grams of crude sRNA were taken up in 200 milliliters of water to form a colloidal solution containing some undissolved solids. The solution contained $40.2 \times 10^3$ $A_{260}$ units (8 $A_{260}$/mg.). To the above solution an equal volume of dimethyl sulfoxide and a one-quarter volume of 3 M sodium chloride were added with chilling. The insoluble matter was removed by centrifugation and 61% of the original $A_{260}$ was recovered in the solution. The sRNA was then precipitated from the solution by the addition of a half colume of ethanol.

The recovered, dried sRNA weighed 2.0 grams (13.2 $A_{260}$/mg.).

The sRNA may be further purified by repeating the above procedure and/or by DEAE cellulose chromatography.

The following are values of amino acid acceptor activity of sRNA produced by the process of this invention from E. coli B. The activity values are given in $\mu$ moles/$A_{260}$ (OD) unit of sRNA determined in a buffer of 0.02 M Mg++/0.1 M tris-(hydroxymethyl)aminomethane (tris), pH 7.5.

| Amino acid: | Activity |
|---|---|
| L-alanine | 75 |
| L-aspartic | 62 |
| L-glutamic | 52 |
| L-isoleucine | 75 |
| L-leucine | 153 |
| L-methionine | 87 |
| L-phenylalanine | 81 |
| L-proline | 61 |
| L-serine | 52 |
| L-tyrosine | 50 |
| L-valine | 124 |

The process of this invention is extremely effective for isolating and purifying sRNA. For example, crude sRNA isolated from *E. coli* contains high molecular weight ribonucleic acid, deoxyribonucleic acid and a considerable amount of non-ultraviolet absorbing materials, such as protein and polysaccharides and without the process of this invention the crude sRNA would have to be subjected to all or some of the following purification procedures; precipitation and/or enzymatic hydrolysis of deoxyribonucleic acid, fractionation of the ribonucleic acids, dialyses, and column chromatography. In addition to the simplicity of the process of the invention, the soluble RNA produced has a purity and biological activity in excess of the soluble RNA currently available.

Many modifications and variations of the present invention are possible in the light of the above teachings. It is therefore to be understood, that within the scope of the appended claims, the invention may be practiced otherwise than as specifically described.

I claim:
1. A process for purifying crude soluble ribonucleic acid comprising:
   (a) mixing a soluble chloride and a highly polar solvent selected from the group consisting of dimethyl sulfoxide, dimethylformamide, and dimethylacetamide, with an aqueous solution of the crude ribonucleic acid, said polar solvent being present in an amount comprising between about 33% and 45%, by volume, of the mixture, whereby impurities are precipitated from the solution; and
   (b) separating the clear phase formed in (a) and recovering purified soluble ribonucleic acid from the clear phase.

2. The process of claim 1 wherein the concentration of soluble chloride is at least about 0.27 M.

3. The process of claim 2 wherein the soluble chloride is selected from the group consisting of potassium, sodium, ammonium and magnesium chlorides.

4. The process of claim 2 wherein the soluble chloride is sodium chloride.

5. The process of claim 4 wherein the purified soluble ribonucleic acid obtained from step (b) is subjected to steps (a) and (b) to obtain a soluble ribonucleic acid of higher purity.

6. The process of claim 4 wherein the temperature is maintained at between about 15° C. and about 35° C. during step (a).

7. The process of claim 4 wherein the highly polar solvent is dimethylformamide.

8. The process of claim 4 wherein the highly polar solvent is dimethyl sulfoxide.

9. The process of claim 4 wherein the highly polar solvent is dimethylacetamide.

10. The process of claim 1 wherein the crude soluble ribonucleic acid is obtained by disrupting a soluble ribonucleic containing substance selected from the group consisting of the various strains of *E. coli* with at least about 405 milliliters of phenol and at least about 935 milliliters of water per 100 grams of the substance.

References Cited
UNITED STATES PATENTS

| | | | |
|---|---|---|---|
| 3,314,937 | 4/1967 | Vendrely et al. | 260—211.5 |
| 3,155,647 | 11/1964 | Dutcher et al. | 260—211.5 |

OTHER REFERENCES

Holley: "Biochem. Biophys. Res. Comm.," vol. 10, pp. 186–188, 1963, Academic Press, New York, N.Y.

LEWIS GOTTS, *Primary Examiner.*

JOHNNIE R. BROWN, *Examiner.*